INVENTORS:
Ioan Doré LANDAU
Stefan GAVAT

BY: Arthur O. Klein

Attorney

__United States Patent Office__  3,500,158
Patented Mar. 10, 1970

3,500,158
COMBINED SPEED CONTROL AND OVERLOAD PROTECTION FOR ASYNCHRONOUS THREE-PHASE MOTORS
Ioan D. Landau and Stefan Gavat, Bucharest, Romania, assignors to Ministerul Industriei Constructilor de Masini, Bucharest, Romania, a firm
Continuation-in-part of application Ser. No. 580,329, Sept. 19, 1966. This application Oct. 30, 1968, Ser. No. 771,842
Claims priority, application Romania, Sept. 30, 1965, 50,327
Int. Cl. H02p 5/34, 5/40
U.S. Cl. 318—227                                                                 13 Claims

ABSTRACT OF THE DISCLOSURE

An asynchronous three-phase motor driven by a regulatable thyratron-like inverter is provided with open-loop speed control so long as the current drawn by the motor load is below a preset overload value. When overload occurs, a threshold device responsive to the motor current is cut in to automatically reduce the motor speed until the load reaches equilibrium at the preset value. Closed-loop facilities are additionally provided for maintaining the motor flux constant at a desired value irrespective of changes in the motor speed and current.

RELATED APPLICATIONS

The present case is a continuation-in-part of applicant's co-pending application, Ser. No. 580,329, now abandoned, filed Sept. 19, 1966 and entitled "Method and Diagram for the Speed Control of Asynchronous Motors Supplied by Static Frequency Converters with Automatic Limitation of the Motor Current."

BACKGROUND OF THE INVENTION

Regulatable inverters are often employed to control the frequency and voltage of asynchronous three-phase motors such as induction machines. One type of inverter employs a plurality of pulse-operated thyratron-like devices, such as thyristors, for interconnecting a source of DC voltage with selected ones of the three-phase stator windings of the motor. For example, in the co-pending application I. D. Landau, Ser. No. 754,530, filed Aug. 19, 1968, entitled Speed Regulation of Asynchronous Three-phased Motors, there is described an improved motor control arrangement of this type for use in squirrel-cage motors wherein the inverter output frequency (which determines the motor speed) is controlled by a closed-loop speed regulator connected in cascade with a closed-loop current regulator for maintaining a preset desired speed even where the latter is so low as to fall below the linear portion of the speed-voltage characteristic of the motor. In this arrangement, the inverter output voltage (which determines the motor flux) is also operated in closed-loop fashion under the control of the output of a flux regulator to maintain the motor voltage constant irrespective of changes in the motor speed and current.

In such a system, closed-loop operation of the speed regulator is effected by driving the latter with a control signal proportional to the difference between the output of a tachometer on the motor shaft and a signal representative of the desired motor speed.

The instant invention is concerned with a modification of this arrangement for providing wide range speed control of the motor at constant flux even where the use of a tachometer (and thus closed-loop speed control) is precluded by space limitations or other factors.

SUMMARY OF THE INVENTION

The constant-flux control arrangement of the present invention automatically drives the motor at a selectable speed when the motor current is below a predetermined overload level and automatically reduces the motor speed to preserve load equilibrium when the motor current tends to exceed the predetermined level. In an illustrative embodiment, a first external DC voltage whose amplitude is indicative of the desired motor speed is applied to a tandem arrangement of a voltage-frequency converter and a ring counter. The output of the counter is in the form of six overlapping pulse sequences whose frequency is a function of the magnitude of the first DC voltage.

The six pulse sequences individually condition six first thyratron-like devices (hereafter "first devices") in the inverter for operation in a sequence effective to define, on the three phase stator winding, a three-phase excitation in one of two opposite senses; the excitation frequency corresponds to the frequency of the pulse sequences. During the conditioning interval, a first sequence of operating pulses are applied to the control electrodes of the first devices from a relatively high frequency clock source.

A suitable current regulator operating in a closed-loop mode continuously monitors the instantaneous total current at the output of the inverter and generates a second control signal proportional to the difference between the instantaneous current and a reference current indicative of the predetermined overload level. The output of the current regulator is applied through a normally nonconductive diode to the input of the voltage-frequency converter, where it is differentially combined with the first control signal. As long as the instantaneous motor current remains below the overload value, the second control signal will have a polarity effective to keep the diode nonconductive. In this way, the first control signal will remain undiminished by the second control signal and will maintain the motor speed at the desired value. If, however, the instantaneous current exceeds the threshold, the polarity of the second control signal will reverse to render the diode conductive, and the resultant reduction in the effective value of the first control signal will cause the speed of the motor to diminish to a value that will sustain current flow to the load at the overload level.

The excitation voltage of the stator winding is made proportional to a third difference signal obtained by comparing a quantity proportional to the instantaneous motor flux with a similar quantity representative of the desired motor flux. The third difference signal is converted to a sequence of second impulses occurring at a rate proportional to the above-mentioned clock rate, with each second impulse occurring a fraction of a clock period after each first operating pulse from the clock source. The second impulses are applied to the control electrodes of a second plurality of thyratron-like devices (hereafter "second devices") connected in turn-off circuits individually shunting the first devices for selectively disabling the first devices upon the application of each of the second impulses. The output voltage of the inverter is proportional to the delay between each first impulse and a succeeding second impulse. In this way, the stator voltage is regulated in such a manner that the flux remains constant irrespective of changes in the inverter output frequency (and thus of the motor speed), whether due to external changes in the first DC voltage or to operation of the overload threshold mechanism.

Provision is additionally made for reversing the sense of the three-phase excitation of the stator winding upon a reversal of polarity of the first DC voltage.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
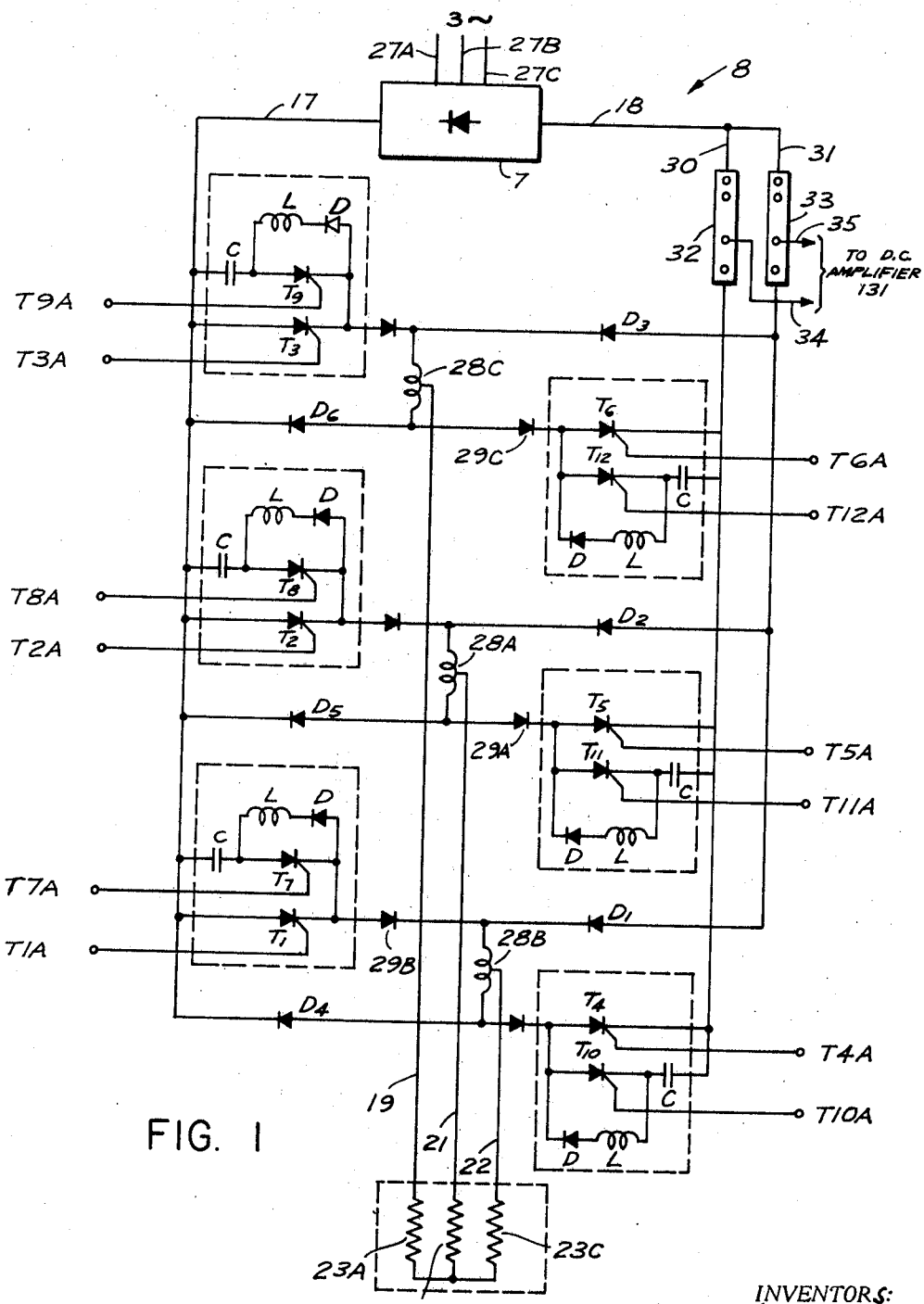
FIG. 1 is a schematic diagram of a pulsed thyratron-type inverter for supplying a three-phase stator winding.
Figure 2:
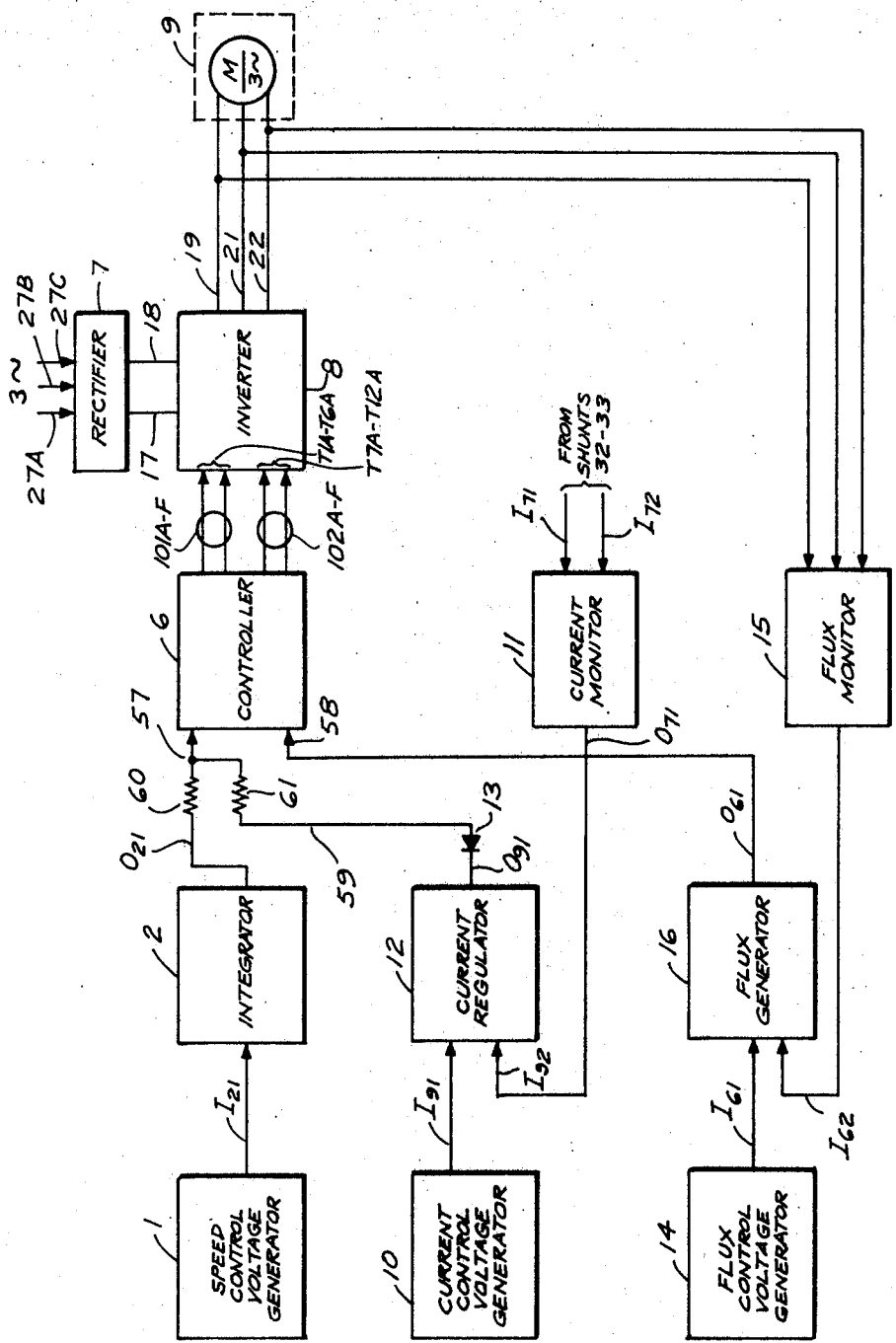
FIG. 2 is a block diagram of an overall motor control arrangement for regulating the output frequency and voltage of the inverter of FIG. 1, including means for overriding a normal open-loop speed control in accordance with the invention when the motor current exceeds a predetermined threshold.

Referring now in more detail to the drawing, FIG. 1 illustrates a pulsed, thyratron-like inverter 8 for converting a DC voltage on a pair of input terminals 17 and 18 to a three-phase AC voltage on a plurality of output lines 19, 21, and 22 that feed a three-phase stator winding 23A, 23B, and 23C of a squirrel cage induction motor 9 (FIG. 2). The input DC voltage may be provided by a conventional three-phase rectifier represented generally by the block (FIG. 1) which is supplied by three-phase AC mains 27A, 27B, and 27C.

Within the inverter 8, the conversion from the input DC voltage to the output three-phase AC voltage is accomplished by selectively exciting the control electrodes (designated T1A–T3A and T4A–T6A) of two groups of first normally inoperative thyratron-like switching devices T1–T3 and T4–T6. As is well known, the term "Thyratron-like device," illustratively a thyristor, refers to a class of switching devices which may be operated by the application of a suitable signal to a control electrode thereof, and which may thereafter be deactivated only by disabling a transconductive path thereof, the control electrode being insensitive once activated by the control signal until the next-succeeding disabling of the transconductive path. Each of the devices T1, T2, and T3 may be selectively coupled in series with one of the remaining devices T4, T5, and T6 to apply the DC voltage appearing at the terminals 17 and 18 to a corresponding pair of the three-phase output leads 19, 21, and 22. For example, if the devices T1 and T5 are simultaneously operated, a conductive path is established from output line 21 to output line 22 via an inductance 28A, a diode 29A. The operated device T5, the rectifier 7, the operated device T1, a diode 29B, and an inductance 28B. If the devices T6 and T1 are simultaneously operated, a conductive path is completed between the output lines 19 and 22 via an inductance 28C, a diode 29C, the operated device T6, the rectifier 7, the operated device T1, the diode 29B and the inductance 28B. In like manner, it can be shown that the DC voltage appearing between the terminals 17 and 18 can be applied to any desired permutation of the output lines 19, 21 and 22 by selectively interconnecting one of the group of devices T1–T3 to one of the other group of devices T4–T6.

If the selected pairs of the devices T1–T6 are cyclically operated in a regular sequence, the corresponding pulses of DC voltage routed to the permuted stator windings 23A–23C through the operated ones of the devices T1–T6 simulate a pulsed, three-phase excitation of the stator in a selected one of two opposite senses. If, for example, the devices T1–T6 are cyclically operated at a frequency $F_1$, a three-phase excitation of the stator winding in one sense may be accomplished by exciting selected pairs of the devices T1–T6 as shown in the following Table 1 at intervals of 60 degrees in the 360° period corresponding to the excitation frequency $F1$:

TABLE 1

| Electrical interval: | Operated devices |
|---|---|
| 0°–60° | T1, T5 |
| 60°–120° | T1, T6 |
| 120°–180° | T2, T6 |
| 180°–240° | T2, T4 |
| 240°–300° | T3, T4 |
| 300°–360° | T3, T5 |

In like manner, it can be shown that a three-phase excitation of the stator winding in the opposite sense may be accomplished by exciting selected pairs of the devices T1–T6 as shown in the following Table 2 at the same 60° intervals:

TABLE 2

| Electrical interval: | Operated devices |
|---|---|
| 0°–60° | T1, T6 |
| 60°–120° | T1, T5 |
| 120°–180° | T3, T5 |
| 180°–240° | T3, T4 |
| 240°–300° | T2, T4 |
| 300°–360° | T2, T6 |

The disabling of the devices T1–T6, once operated by pulses applied to their control electrodes, may be accomplished by energizing the control electrodes designated (T7A–T12A) of a plurality of second normally inoperative thyratron-like devices $7_7$–$T_{12}$ similar to the devices T1–T6 and individually connected in series with capacitors C across the transconductive paths of the first devices $T_1$–$T_6$. The devices $T_7$–$T_{12}$ are respectively shunted by an tive thyratron-like devices $T_7$–$T_{12}$ similar to the devices $T_7$–$T_{12}$, when operated is automatically disabled by the operation of a turn-off circuit which includes (1) the associated inductance L, Diode D, and capacitance C; (2) the rectifier 7, and (3) one or more of the resistances 28 and diodes 29. As will be described later, the operation of the respective second devices $T_7$–$T_{12}$ may be accomplished at the conclusion of a prescribed interval (i.e., the "operated interval") after the energizing of the associated one of the first devices $T_1$–$T_6$. If as assumed above, the devices T1–T6 are cyclically operated in pairs at the frequency $F_1$, the output voltage across the then-connected pair of the inverter output leads 19, 21, and 22 will be determined by the fraction of the period corresponding to the frequency $F_1$ occupied by the time of operation of each of the devices T1–T6. Thus, the frequency of the three-phase excitation of the stator windings 23A–23C by the inverter 8 will be proportional to the cyclic rate of excitation of the first devices T1–T6, while the magnitude of the stator voltage will be proportional to the interval between the triggering of operation of each selected pair of the first devices and the triggering of operation of the shunting ones of the second devices T7–T12.

A controller 6 is provided for converting first and second control signals (described below) respectively appearing on a pair of input lines 57 and 58 thereof into two sets of pulse sequences respectively appearing on two sets of output lines 101A–101F and 102A–102F thereof. The output lines 101A–101F responsive to the first control signal are coupled to the control electrodes T1A–T6A of the first devices T1–T6 in the inverter 8 for setting the inverter output frequency (and thereby the motor speed). Similarly, the output lines 102A–102F responsive to the second control signal are coupled to the control electrodes T7A–T12A of the second devices T7–T12 for setting the inverter output voltage (and thereby the motor flux). The controller 6 is shown in more detail in FIG. 3. The first control signal on the input line 57 is coupled to the input of a voltage frequency converter 56. The latter may be of the type described in the above-mentioned co-pending application of I. D. Landau. The output wave forms of each of the components of the controller 6 are identified by corresponding designations in FIG. 4. The converter 56 generates, on an output $O_{264}$ (FIG. 4), a sequence of pulses occurring at the rate $F_1$ proportional to the magnitude of the first control signal on the line 57.

The sequence of relatively wide pulses $O_{264}$ is converted to a sequence of narrow impulses occurring at the same rate $F_1$ by a conventional pulse-forming circuit 18. This impulse sequence, designated $I_{191}$, triggers a six-element, conventional ring counter 19 (FIG. 3) which individually provides, on a plurality of output leads $O_{191}$–$O_{196}$, six successively delayed pulse sequences each having a repetition rate $F_2 = \frac{1}{6}F_1$ and a pulse width equal to one period of the input frequency $F_1$ (e.g., $\frac{1}{6}$ of a period of the rate $F_2$). Selected pairs of the outputs of the ring counter 19 are applied to the inputs of six first NOR gates 33–38. The connection pattern of the ring counter outputs to the gates 33–38 is chosen to yield six overlapping second pulse sequences each of which has (a) the repetition frequency $F_2$; (b) a pulse width equal to $\frac{1}{3}$ of a period represented by the frequency $F_2$; and (c) a mutual overlap of $\frac{1}{6}$ of the latter period. For example, as shown in FIG. 4 if the time A represents the time origin, the pulse sequence at the output of the gate 33 (i.e., the "sequence 33") is in a first state for the first 120° of its repetition cycle, and in a second state for the remainder of the cycle; the pulse sequence 38 is in its first state from 60 to 180°; the pulse sequence 34, from 120 to 240°; the sequence 36, from 180 to 300°; the sequence 35 from 240 to 360°; and the sequence 37, from 300 to 360° and from 0 to 60°. Because of the overlap of the pulse sequences, two of the sequences 33–38 are always in their first state at any one time.

The outputs of the gates 33–38 (FIG. 3) are individually applied to conditioning inputs 21A–26A of six second NOR gates 21–26. Thus the gates 21–26 are conditioned in an overlapping pattern corresponding to that of the pulse sequences on the outputs of the first gates 33–38. The second gates 21–26 are further provided with a plurality of enabling inputs 21B–26B through which suitable operating signals may be outpulsed to the control electrodes T1A–T6A (FIG. 1) in the inverter 8 through a corresponding plurality of impulse amplifiers 27–32 (FIG. 3) during the conditioned intervals of the associated gates 21–26. As a result, the first devices T1–T6 are "conditioned" in an overlapping sequence corresponding to that of the pulses on the outputs of the first gates 33–38. In particular, the first devices T1 and T5 associated with the sequences 33 and 37 are conditioned for operation during the first 60° of the repetition cycle commenced at the time A of FIG. 4; the devices T1 and T6 associated with the sequences 33 and 38 are conditioned during the next 60°; and so on. It will be noted that the sequence of conditioning of the devices T1–T6 corresponds to the excitation pattern shown above in Table 1 for imparting, to the stator windings 19, 21 and 22, the one sense of the three-phase excitation. The output frequency of the inverter 8 (FIG. 1) is determined by the conditioning rate $F_2$, which in turn is proportional to the amplitude of the first control signal on the line 57 (FIG. 3).

Figure 3:
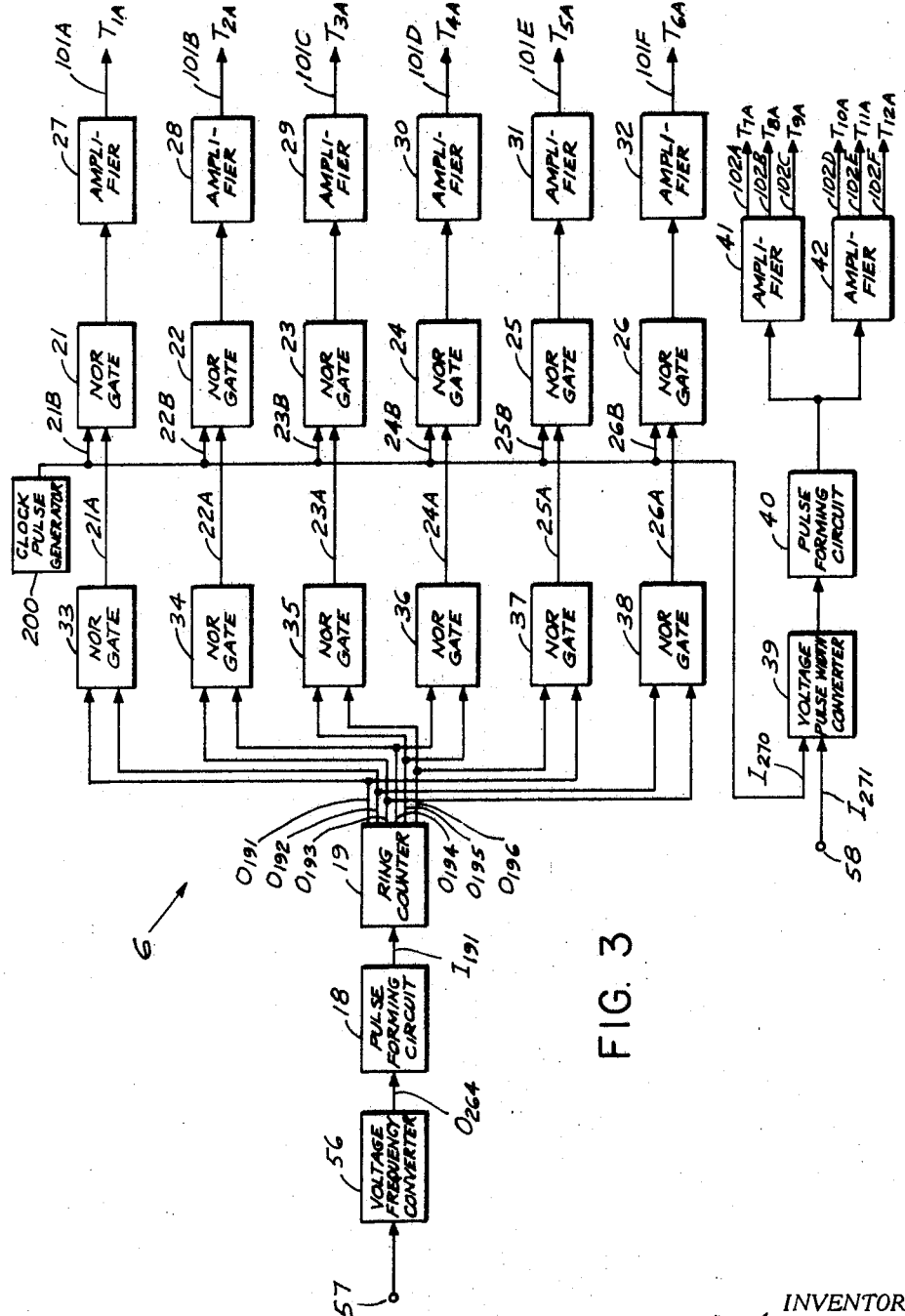
FIG. 3 is a schematic diagram of an inverter controller suitable for use in the arrangement of FIG. 2.
Figure 4:
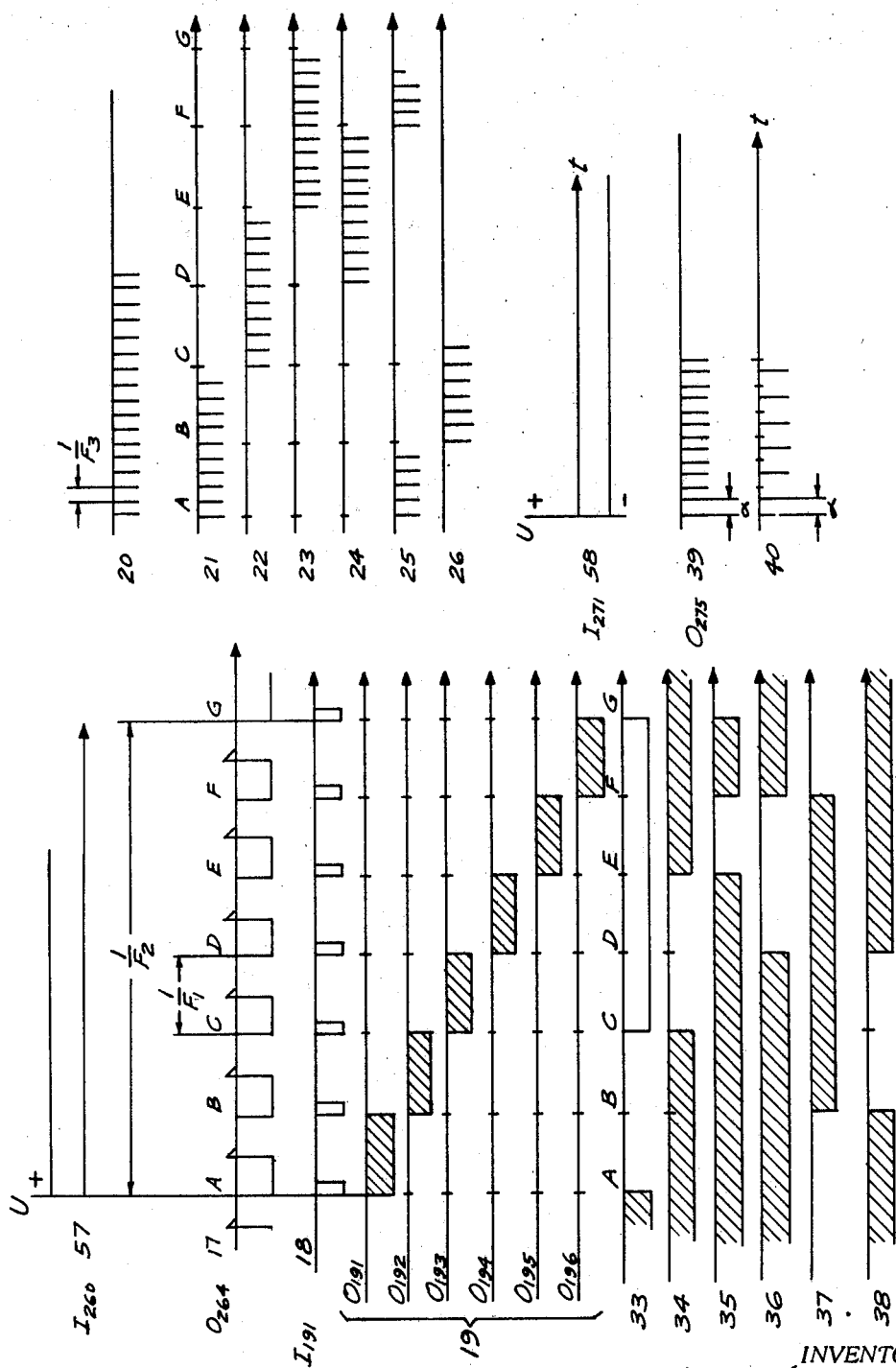
FIG. 4 is a set of wave form diagrams at various portions of the arrangement of FIG. 3.

The operating signals applied to the enabling inputs 21B–26B of the second gates 21–26 are obtained from a clock generator 200, which outpulses a sequence of first pulses occurring at a repetition rate $F_3$ (FIG. 4) which may be proportional to and several times larger than the frequency $F_1$ of the pulses applied to the ring counter 19 (FIG. 3). Thus, during each conditioned interval of the second NOR gate 21, for example, a succession of first clock impulses occurring at the rate $F_3$ is gated through the amplifier 27 to turn on the device $T_1$. Similar excitation of the devices T2–T6 is accomplished by gating the clock impulses from the generator 20 through the conditioned ones of the second gates 22–26 at the repetition rate $F_3$.

The second control signal on the input line 58 is applied to the input of a voltage-pulse width converter 39. The converter 39 (which may also be of the type described in the above-mentioned co-pending application of I. D. Landau) generates, on an output $O_{275}$, a sequence of pulses occurring at a rate synchronized with and proportional to the first clock rate $F_3$ and having a pulse width $\alpha$ equal to a fraction of its repetition period determined by the magnitude of the control signal $I_{271}$. The pulses $O_{275}$ are applied to the input of a pulse forming circuit 40, which is triggered by the trailing edge of each of the pulses $O_{275}$ to generate a corresponding sequence of second clock impulses occurring at the repetition rate of the pulses $O_{275}$. The second clock impulses are coupled to the control electrodes T7A–T12A of the devices T7–T12 (FIG. 1) through amplifiers 41 and 42 (FIG. 3). The second clock pulses are delayed by the interval with respect to the start of each repetition period of the pulses $O_{275}$, which is in turn synchronized with the start of the repetition period of selected ones of the first clock impulses. Thus, occurrences of the second sequences of clock impulses on the output of the circuit 40 are correspondingly delayed with respect to the occurrences of the first clock impulses at the output of generator 200; accordingly, the devices T1–T6 are each operated only over the interval $\alpha$ during each excitation period of the pulses $O_{275}$. The output-voltage of the stator windings 19, 21 and 22 (FIG. 1) is proportional to the quantity and thereby to the magnitude of the second control signal on the input 58 (FIG. 3).

The first control signal that determines the speed of the motor normally takes the form of a second variable DC voltage coupled to the input 57 of the controller 6 through a resistor 60. The second DC voltage, whose effective rate of change when varied is limited by an integrator 2 to avoid sudden changes in load current during acceleration and deceleration of the motor 9, may be generated in a suitable external source 1 (e.g., a potentiometer) generally designated "speed control voltage generator" in FIG. 2.

Figure 5:
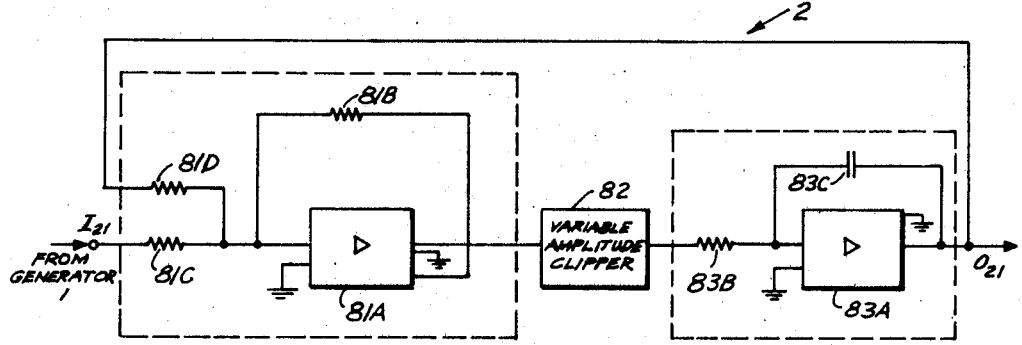
FIG. 5 is a schematic diagram of an integrator suitable for use in the arrangement of FIG. 2.

In particular, the integrator 2 converts the second DC voltage at the output of the generator 1 into a ramp signal whose final voltage is equal to the input DC voltage. The slope of the ramp, which determines the rate of change of the input voltage, is determined by the setting of a variable amplitude clipper 82 (FIG. 5). For this purpose, the output voltage of the generator 1 is applied through a resistor 81C to the input of a balanced amplifier 81A having a feed back path that includes a resistor 81B. The gain of the amplifier 81A is made sufficiently high so that its output saturates at the value determined by the amplitude setting of the clipper 82, whose input is coupled to the output of the amplifier 81A. The clipper output is coupled to the input of an integrating amplifier 83A through a resistor 83B. The amplifier 83A has a feed back path including a capacitor 83C. The output of the amplifier 83A, which is coupled to the resistor 60, is also fed back to the input of the high-gain amplifier 81A through a resistor 81D to provide an effective input signal to the amplifier 81A that is equal to the difference between the DC voltage input from the generator 1 and the instantaneous voltage at the output of the amplifier 83A.

With this arrangement, each voltage step applied to the input of the resistor 81C from the generator 1 triggers a ramp whose slope is determined by the setting of the clipper 82 and whose final voltage value is constrained, by means of the feed back path through the resistor 81D, to a value equal to the final steady-state voltage from the generator 1.

Referring again to FIG. 2, the second control signal on line 58, which determines the motor flux, may be independently set and maintained at a desired value in closed-loop fashion by a flux regulator 16. The second control signal is made proportional to the deviation of a DC voltage proportional to the actual motor flux (as measured by a flux monitor 15) and a reference DC voltage (analogous to the output of the generator 1) that is proportional to the desired value of the motor flux. This reference DC voltage may be generated in a second suitable source 14 (e.g. a potentiometer) generally designated "flux control voltage generator" in FIG. 2.

In accordance with the invention, an arrangement is provided for automatically diminishing the motor speed normally set by the output of the generator 1 by reducing the value of the first control signal when the total motor current appearing on the output lines 19, 21, and 22 of the inverter 8 exceeds a predetermined overload value. The reduction of the first control signal is accomplished by differentially combining of the signals applied to the controller 6 through the resistor 60 and the resistor 61. The first control signal is applied from the output of the integrator 2 on a line 57 and the third control signal is applied on a line 59 whenever and only whenever the motor current exceeds the predetermined overload value.

The third control signal, which is generated in a current regulator 12, is proportional to the difference between a voltage corresponding to the actual motor current (as derived by a current monitor 11) and a reference DC voltage proportional to the predetermined overload value of the current. The latter DC voltage may be generated in a suitable source 10 (e.g., a potentiometer), generally designated "current control voltage generator" in FIG. 2.

Since the motor current at any instant may be either greater or less than the predetermined overload current value, the polarity of the third control signal will manifest a corresponding one of two opposite signs. Since it is desired to normally operate the motor 9 in open loop fashion at a speed determined by the output DC voltage of the generator 1 irrespective of the motor current so long as such current is below the overload value, a suitable threshold device such as a diode 13 is interposed in the line 59 between the output of the current regulator 12 and the resistor 61. The diode 30 is poled to be nonconductive in response to the polarity of the third control signal when the actual motor current is below the overload value. However, when the motor current exceeds the threshold, the polarity of the second control signal reverses; and when its amplitude corresponding passes through zero to the small value (hereafter "threshold value") necessary to render the diode conductive, the third control signal will be applied to the controller 6 through the diode to diminish the value of the first control signal on the line 57. This will reduce the speed of the motor until the third control signal again falls below its threshold, i.e., until the actual motor speed is again reduced below the overload value. Whenever the motor current rises above the overload value, therefore, the current control system acts in closed-loop fashion (by virtue of the operation of the current regulator 11) to reduce the speed of the motor to a value sufficient to bring the load current down to the overload value and to establish load equilibrium at that value. When the load current subsequently falls below the overload value, the third control signal reverses polarity to cut the diode 13 off and to thereby restore the normal open-loop speed control via the generator 1.

Figure 6:
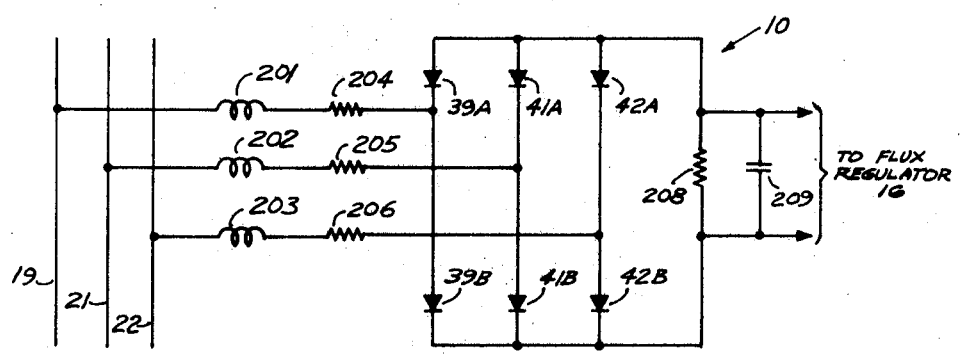
FIG. 6 is a block diagram of a monitor coupled to the motor stator winding of FIG. 1 for producing signals proportional to the motor flux.

A suitable embodiment of the flux monitor 15 is shown in FIG. 6. The simulator includes three parallel pairs of serially-connected diodes 39A–39B, 41A–41B, and 42A–42B defining a three-phase bridge rectifier 207. The inverter output lines 19, 21, and 22 are individually coupled to the junctions of the three parallel pairs of diodes through three monitoring paths including inductors 201, 202, and 203 and resistors 204, 205, and 206, respectively. An output DC component representative of the motor stator voltage is generated across a resistor 208 and a capacitor 209 connected in shunt with the respective pairs of diodes. The resistors 204, 205, and 206 and the inductors 201, 202, and 203 are chosen such that the time constant of each monitoring path is equal to $$\frac{L_S + L_L}{R_S}$$

where $L_S$ is the self-inductance of the stator, $L_L$ is the leakage inductance of the stator, and $R_S$ is the stator winding resistance.

Figure 7:
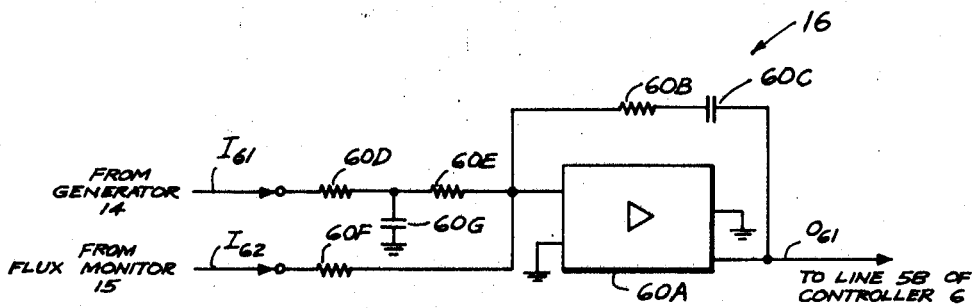
FIG. 7 is a schematic diagram of a motor flux regulator suitable for use in the arrangement of FIG. 2.

One embodiment of the flux regulator 16 is shown in FIG. 7. The reference DC signal from the generator 14 is applied through a pair of resistors 60D and 60E to the input of an amplifier 60A. A capacitor 60G is connected between the junction of the resistors 60D and 60E and ground for surge elimination purposes. The regulator 16 combines the DC voltage from the generator 14 with the output of the flux monitor 15, which is applied to the input of the amplifier 60A through a resistor 60F. The output of the amplifier 60A, which is fed back to its input through a capacitor 60C and a resistor 60B, defines the second control signal appearing on the input line 58 of the controller 6.

Figure 8:
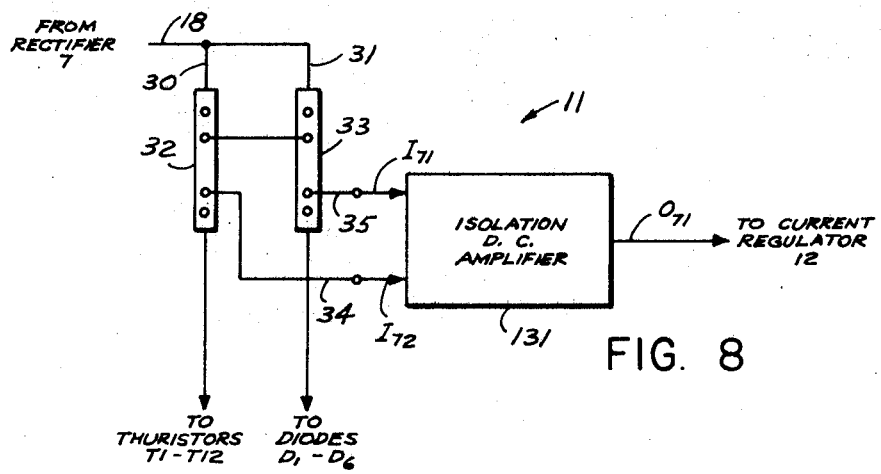
FIG. 8 is a schematic diagram of a monitor coupled to the stator winding in the arrangement of FIG. 2 for supplying a DC signal proportional to the total motor current.

The current monitor 11 is shown in FIGS. 1 and 8. A pair of shunts 32 and 33 (FIG. 1) are respectively interposed in a pair of parallel lines 30 and 31 serially connected with the rectifier 7 that supplies the inverter 8. The line 30 forms the common return for each of the thyristor devices T1–T12, which supply the real component of the inverter current to the load via the chokes 28A–28G. The line 31 forms a common return for a plurality of diodes D1–D6, which supply reactive current to the load via the resistors 28A–28G. A voltage proportional to the vector sum of the currents through the shunts 32 and 33, which voltage is taken across a pair of lines 34 and 35, is therefore proportional to the total current drawn by the load. The voltage across the lines 34 and 35 is applied to the current regulator 12 through a DC isolation amplifier 131 (FIG. 8).

Figure 9:
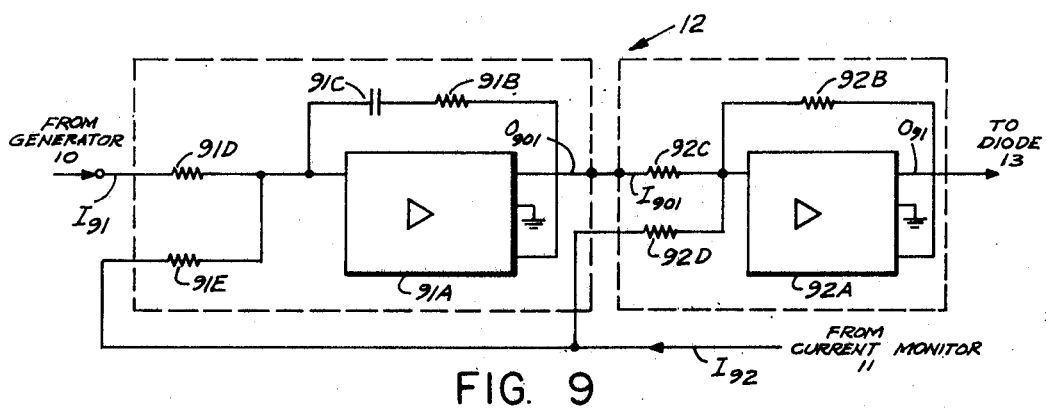
FIG. 9 is a schematic diagram of a motor current regulator suitable for use in the arrangement of FIG. 2.

FIG. 9 depicts an illustrative form of the current regulator 12. The regulator includes two amplifiers 91A and 92A connected in cascade. Each of the amplifiers 91A and 92A includes a pair of symmetrical outputs, one of which is coupled to the corresponding amplifier input through an associated feedback path. The feedback path of the input amplifier 91A includes a resistor 91B in series with a capacitor 91C. The feedback path of the output amplifier 92A includes a resistor 92B only.

A pair of resistors 91A and 91E respectively couple the input of the amplifier 91A to the output of the generator 10 and to the output of the current monitor 11. Similarly, a pair of resistors 92C and 92D respectively couple the input of the amplifier 91B to an output of the amplifier 91A and the output of the current monitor 5. Further details of this type of current regulator may be found in Transactions of the IEEE (IGA Group), vol. 2, No. 5, pp. 334–340 (1966).

Figure 10:
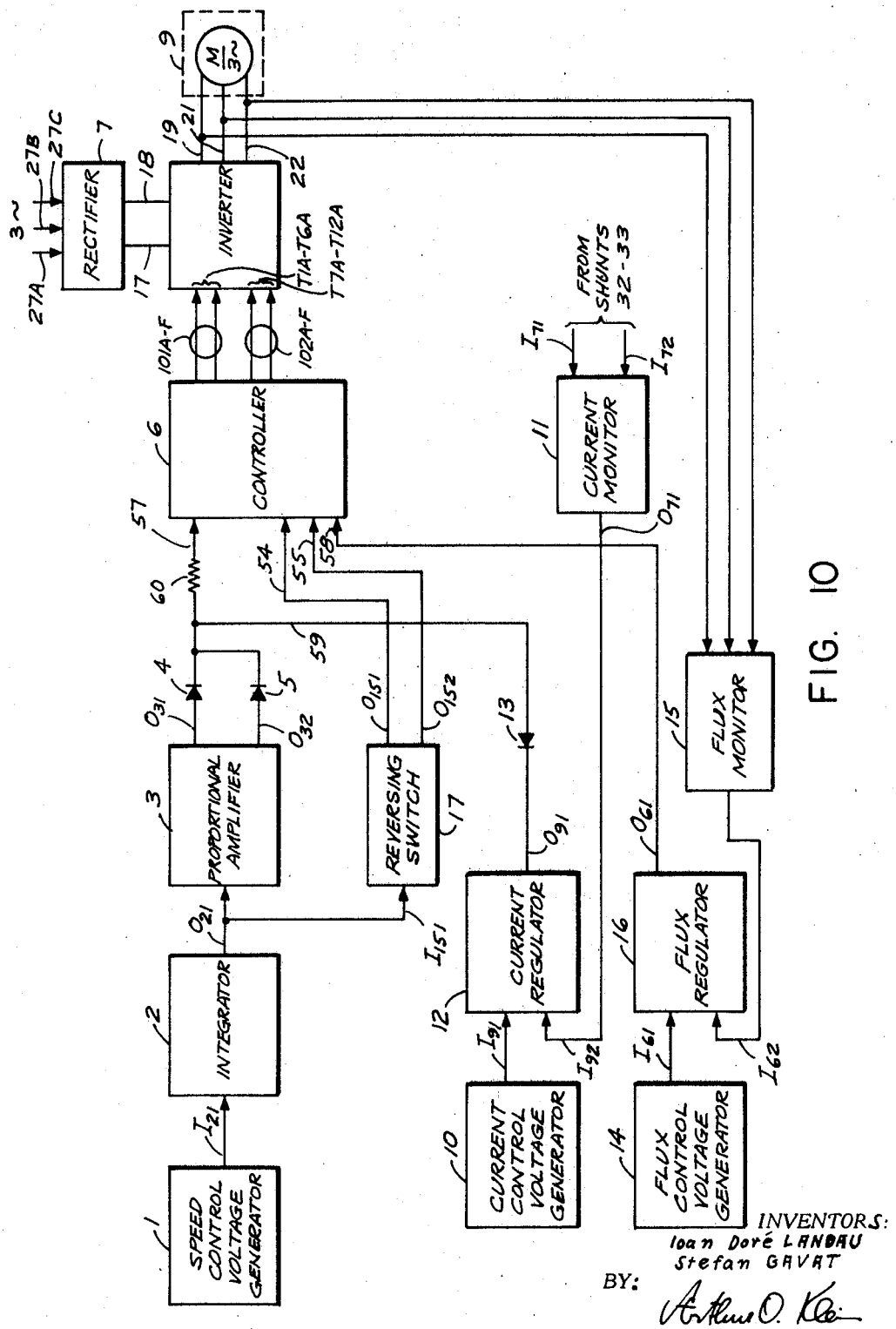
FIG. 10 is a block diagram of an arrangement similar to FIG. 2 but additionally incorporating means for reversing the sense of the three-phase stator excitation upon a reversal of polarity of an external speed control voltage.

FIG. 10 shows an overall block diagram of a motor frequency and voltage control system similar to that of FIG. 2, but additionally incorporating facilities for reversing the sense of the three-phase excitation pattern of the stator winding (and therefore the motor direction) in response to a reversal of polarity in the output DC voltage of the generator 1. Corresponding components in FIGS. 2 and 10 have been given corresponding reference numerals.

Figure 11:
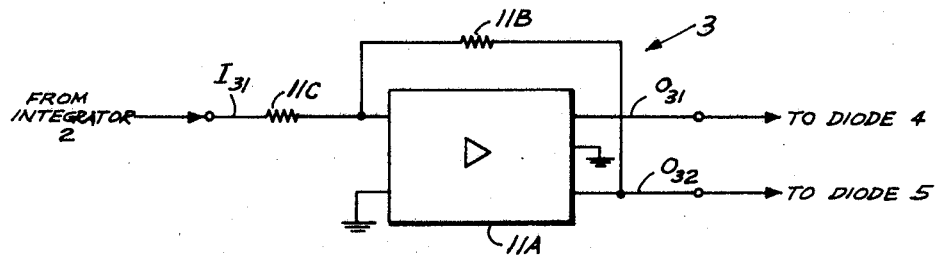
FIG. 11 is a schematic diagram of a proportional amplifier suitable for use in the arrangement of FIG. 10.

To provide this reversing capability, the output of the integrator 2 (FIG. 10) is applied in parallel to the inputs of a proportional amplifier 3 and of a reversing switch 17. One embodiment of the proportional amplifier is shown in FIG. 11. The output of the integrator 2 is applied through a resistor 11C to the input of an amplifier 11A. The amplifier 11A is provided with a pair of paired symmetrical outputs $0_{31}$ and $0_{32}$, which are applied in parallel to the inputs of a pair of similarly poled diodes 4 and 5 whose outputs are coupled to the line 57, (FIG. 10). One of the outputs of amplifier 11a (FIG. 11) is also fed back to the amplifier input through a resistor 11B. With this arrangement, a voltage of invariant polarity is coupled from the integrator to the line 57 irrespective of the instantaneous polarity of the reference DC voltage at the output of the generator 1.

The reversing switch 17 (FIG. 10) may be an analog-to-digital converter so designed that (a) a negative DC voltage applied thereto is converted into a pair of binary bits having the binary states 1 and 0 which individually appear on first and second outputs $O_{151}$ and $O_{152}$, respectively of the converter; and (b) a positive DC voltage applied thereto is converted into a pair of binary bits having the complementary binary states 0 and 1 which individually appear on the first and second outputs, respectively, of the converter. As a result, an enabling pulse (i.e., a binary 1) appears on an output $O_{151}$ but not on the output $O_{152}$ when the input DC voltage from the integrator 2 is negative. On the other hand, an enabling pulse appears on the output $O_{152}$ but not on the input $O_{151}$ when the input voltage from the integrator is positive.

Figure 12:
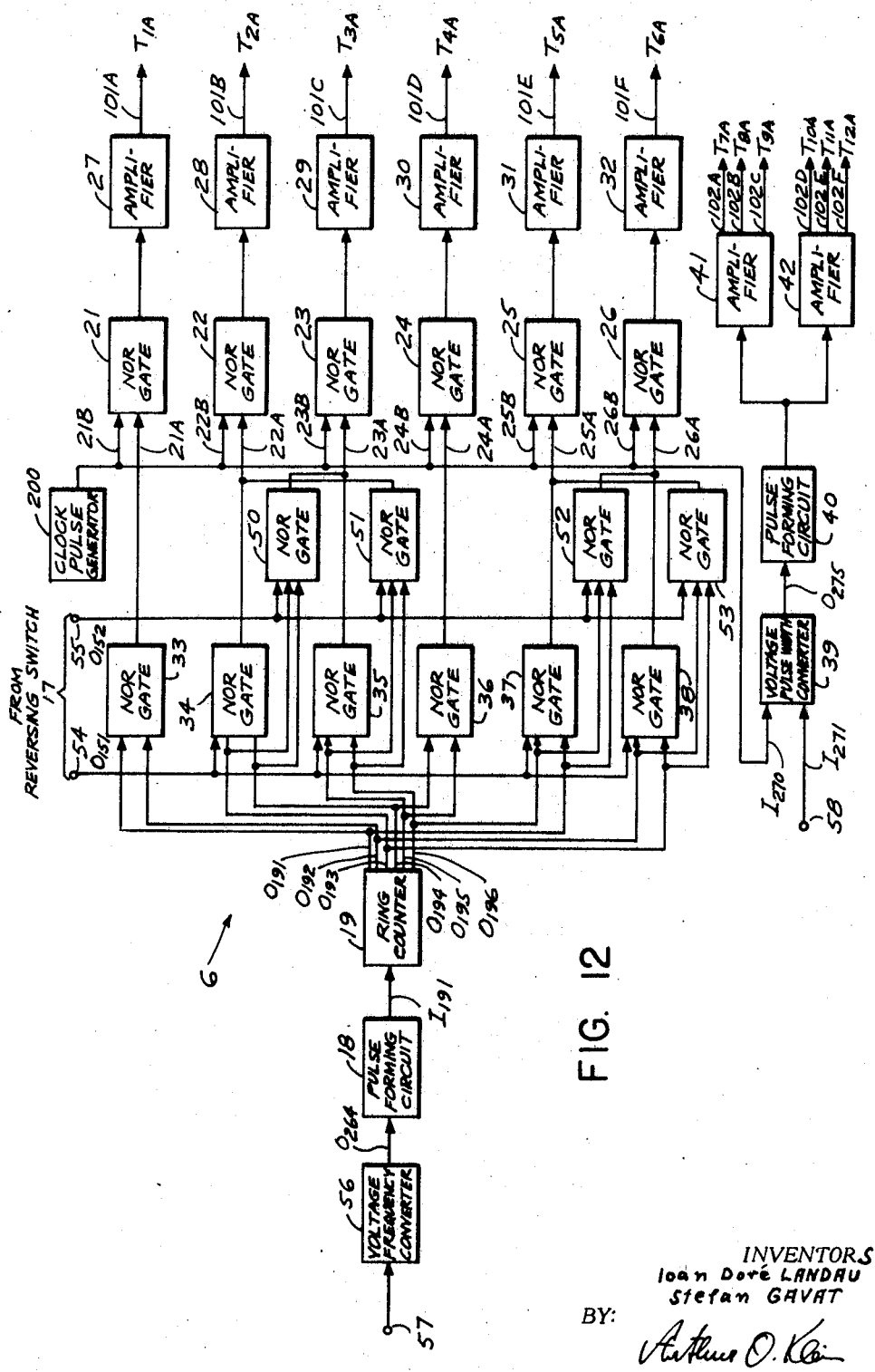
FIG. 12 is a block diagram of an inverter controller suitable for use in the arrangement of FIG. 10.
Figure 13:
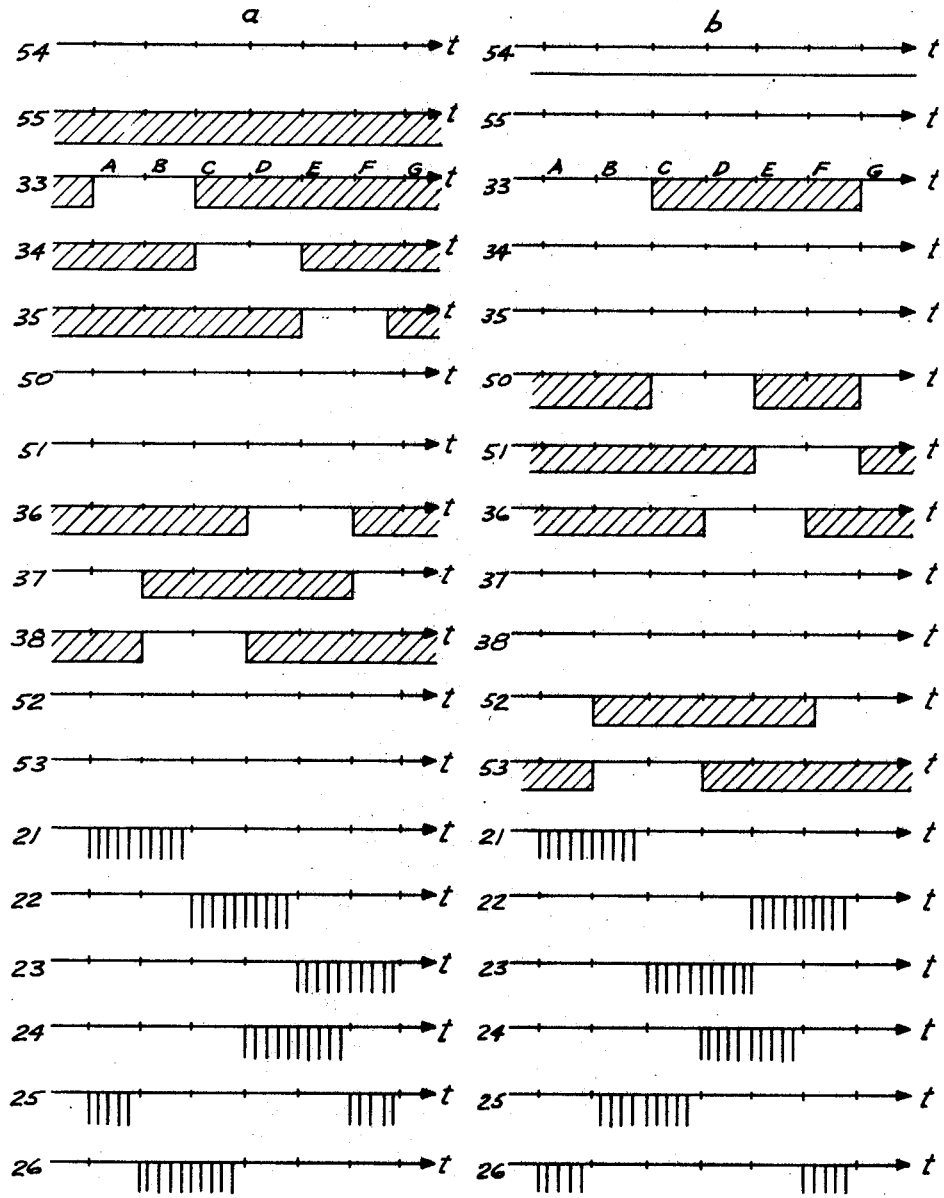
FIG. 13 is a set of wave form diagrams at various portions of the arrangement of FIG. 12.

The outputs $O_{151}$ and $O_{152}$ of the reversing switch 17 are respectively applied to a pair of auxiliary input lines 54 and 55 (FIG. 12) at the input of the controller 6. (Corresponding elements in FIGS. 3 and 12 have been given corresponding reference numerals.) The presence of an enabling pulse on one or the other of the lines 54 and 55 determines the sense of the three-phase excitation winding by selecting one of two opposite patterns of application of the first pulse sequences from the output of the ring counter 19 to the second NOR gates 21–26. In particular, when an enabling pulse appears on the line 54 from the reversing switch 17, the outputs of the ring counter 19 are combined in the gates 33–38 to condition the NOR gates 21–26 in the pattern shown in FIG. 13A, which defines the inverter excitation pattern corresponding to Table 1 above. When the enabling pulses from the reversing switch 17 are switched from the line 54 to the line 55, however, the NOR gates 34, 35, 37, and 38 are disabled and a plurality of additional NOR gates 50, 51, 52, and 53 are enabled, so that the conditioning inputs of the gates 21–26 are respectively coupled to the outputs of the gates 33, 50, 51, 36, 52, and 53. In this case, the outputs of the ring counter 19 condition the NOR gates 21–26 in the pattern shown in FIG. 13B, which corresponds to the inverter excitation pattern of Table 2 above.

In the foregoing, the invention has been described in connection with a preferred embodiment thereof. Many variations and modifications will now become apparent to those skilled in the art.

What is claimed is:

1. In an apparatus for operating an asynchronous three-phase motor at a selectable speed when the motor current is below a predetermined overload level and for automatically reducing the speed of the motor when the motor current tends to exceed the predetermined level:

a motor power supply comprising, in combination, three output lines respectively coupled to the phases of the stator winding of the motor, and a plurality of normally-inoperative thyratron-like switching means for coupling a first external DC voltage to selected pairs of the output lines;

means for cyclically conditioning the switching means for operation over a first interval to define a three-phase excitation pattern of the stator winding in one of two opposite senses, the output frequency of the power supply being determined by the length of the first interval;

means for adjusting the length of the first interval in accordance with the magnitude of a first control signal that is normally proportional to the selected motor speed;

first means for generating a second control signal proportional to the difference between the instantaneous level of the motor current and the predetermined level of the motor current so that the second control signal exceeds a threshold value when the motor current exceeds the predetermined level;

normally-disabled means coupled to the first generating means for reducing the amplitude of the first control signal by an amount proportional to the magnitude of the second control signal when the reducing means are enabled; and means rendered effective when the second control signal exceeds the threshold value for enabling the reducing means.

2. Apparatus as defined in claim 1, in which the reducing means comprises a normally-nonconductive first diode interconnecting the output of the first generating means and the input of the conditioning means, the first diode being rendered conductive when the second control signal passes through the threshold value in a selected one of two opposite senses.

3. Apparatus as defined in claim 1, in which the apparatus further comprises means for limiting the rate of change of the first control signal, the limiting means comprising, in combination, a first amplifier having a first feedback path including a resistance for interconnecting the output and input of the first amplifier; clipping means coupled to the output of the first amplifier for limiting the output of the first amplifier to a selectable value; a second amplifier having a second feedback path including a capacitance for interconnecting the output and input of the second amplifier; means for coupling the output of the clipping means to the input of the second amplifier; a third feedback path including a resistance for coupling the output of the second amplifier to the input of the first amplifier; means for coupling a second DC voltage to the input of the first amplifier; and means for coupling the output of the second amplifier to the input of the conditioning means.

4. Apparatus as defined in claim 3, in which the coupling means comprises, in combination, a third amplifier having a pair of balanced symmetrical outputs; means for coupling the output of the second amplifier to the input of the third amplifier; a pair of second diodes individually coupled in like senses to the outputs of the third amplifier; and means for coupling the outputs of the second diodes in parallel to the input of the conditioning means.

5. Apparatus as defined in claim 1, in which the first generating means comprises, in combination, means for generating a first monitoring signal proportional to the actual motor current; fourth and fifth amplifiers connected in cascade and having fourth and fifth feedback paths for coupling the outputs and inputs of the respective amplifiers, the fourth feedback path having a capacitance and a resistance and the fifth feedback path having a resistance; means for applying a signal representative of the predetermined level of the motor current to the input of the fourth amplifier; and means for applying the first monitoring signal in parallel to the inputs of the fourth and fifth amplifiers, the second control signal appearing on the output of the fifth amplifier.

6. Apparatus as defined in claim 1, in which the thyratron-like switching means comprises, in combination, a first plurality of thyristors each having a control electrode and a transconductive path, and means for coupling the transconductive paths of selected pairs of the first thyristors in series across corresponding pairs of the output lines.

7. Apparatus as defined in claim 6, in which the conditioning means comprises, in combination, means for generating a first pulse sequence having a frequency $F_1$ proportional to the magnitude of the first control signal; a ring counter for converting the first pulse sequence into N overlapping second pulse sequences each having a frequency $F_1/N$; a plurality of first gating means each having a conditioning input and an enabling input; means for individually coupling the second pulse sequences to the conditioning inputs of the first gating means in one of two complementary interconnection patterns; and means for individually coupling the outputs of the first gating means to the control electrodes of the first thyristors.

8. Apparatus as defined in claim 7, in which the apparatus further comprises means for selectively reversing the sense of the three-phase excitation of the stator winding, the reversing means comprising, in combination, an analog-to-digital converter responsive to opposite polarities of the first control signal for generating a pair of binary bits arranged in one of two complementary patterns of relative states uniquely indicative of the instantaneous polarity of the first control signal whereby a change in polarity of the first control signal reverses the pattern of binary states; and means rendered effective upon each reversal of the pattern of binary states on the output of the converter for altering the interconnection pattern between the second sequences of pulses and the conditioning inputs of the first gating means.

9. Apparatus as defined in claim 7, in which the apparatus further comprises a second plurality of thyristors each having a control electrode and a transconductive path, and means for individually coupling the transconductive paths of the second thyristors across the transconductive paths of the first thyristors to disable the latter when the control electrodes of the associated second thyristors are energized.

10. Apparatus as defined in claim 9, further comprising means for operating the conditioned switching means over a prescribed first fraction of the first interval, the operating means comprising, in combination, means for generating a third sequence of pulses at a rate related to and higher than $F_1$; means for generating a fourth sequence of pulses at a rate proportional to the rate of the third sequence but delayed with respect to the third sequence by the first fraction of the first interval; means for applying the third sequence of pulses to the enabling inputs of each of the first gating means; and means for applying the fourth sequence of pulses to the control electrodes of each of the second thyristors.

11. Apparatus as defined in claim 10, further comprising means for generating a third control signal proportional to the difference between the instantaneous value of the motor flux and a reference value of the motor flux, and means for adjusting the first fraction of the first interval in proportion to the magnitude of the third control signal.

12. Apparatus as defined in claim 11, in which the means for generating the third control signal comprises, in combination, means for generating a second monitoring signal proportional to the actual motor flux; a sixth amplifier having a sixth feedback path including a capacitance and a resistance for interconnecting the output and input sixth amplifier; means for combining the second monitoring signal and a signal representative of the preset value of motor flux to produce a fourth control signal; and means for applying the fourth control signal to the input of the sixth amplifier, the third control signal appearing on the output of the sixth amplifier.

13. Apparatus for operating an asynchronous three-phase motor at a selectable speed and a constant flux when the motor current is below a predetermined overload level and for automatically reducing the speed of the motor when the motor current tends to exceed the predetermined level, which comprises:
  a motor power supply comprising, in combination, three output lines respectively coupled to the phases of the stator winding of the motor, and a plurality of normally-inoperative thyratron-like switching means for interconnecting an external source of DC voltage with selected pairs of the output lines;
  means for cyclically conditioning the switching means for operation over a first interval to define a three-phase excitation pattern of the stator winding in one of two opposite senses, the output frequency of the power supply being determined by the length of the first interval;
  means for operating the conditioned switching means over a prescribed fraction of the first interval to couple pulses of the DC voltage to the associated pairs of the output lines, the output voltage of the power supply being determined by the operated fraction of the first interval;
  means for adjusting the length of the first interval in accordance with the magnitude of a first control signal that is normally proportional to the selected motor speed;
  first and second means for individually generating second and third control signals respectively proportional to the difference between the instantaneous values of the motor flux and current and reference values of the motor flux and current, the reference current value being set at the predetermined level so that the third control signal passes through a threshold value in a first direction when the motor current exceeds the predetermined level;
  means for adjusting the operated fraction of the first interval in accordance with the magnitude of the second control signal;
  normally-disabled means coupled to the second generating means for reducing the amplitude of the first control signal by an amount proportional to the magnitude of the third control signal when the reducing means are enabled; and
  means rendered effective when the third control signal passes through the threshold value in the first direction for enabling the reducing means.

References Cited

UNITED STATES PATENTS

| | | | |
|---|---|---|---|
| 3,344,326 | 9/1967 | Risberg | 318—230 |
| 3,372,323 | 3/1968 | Guyeska | 318—230 |
| 3,394,297 | 7/1968 | Risberg | 318—230 XR |

ORIS L. RADER, Primary Examiner

G. RUBINSON, Assistant Examiner

U.S. Cl. X.R.

318—230